No. 700,607. Patented May 20, 1902.
B. C. BATCHELLER.
SENDING APPARATUS FOR PNEUMATIC DESPATCH SYSTEMS.
(Application filed July 31, 1901.)
(No Model.) 7 Sheets—Sheet 1.
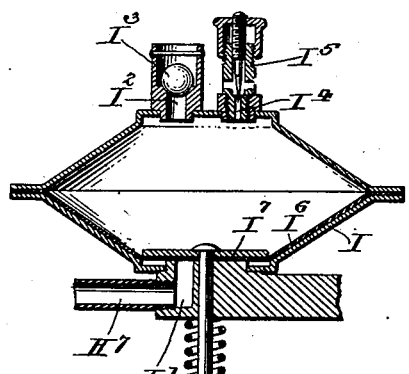
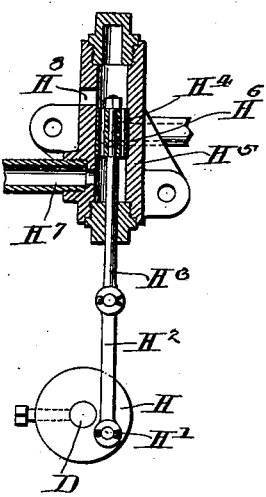
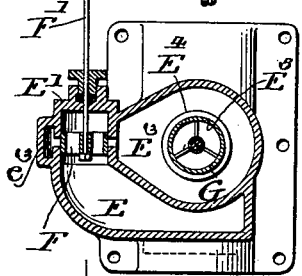
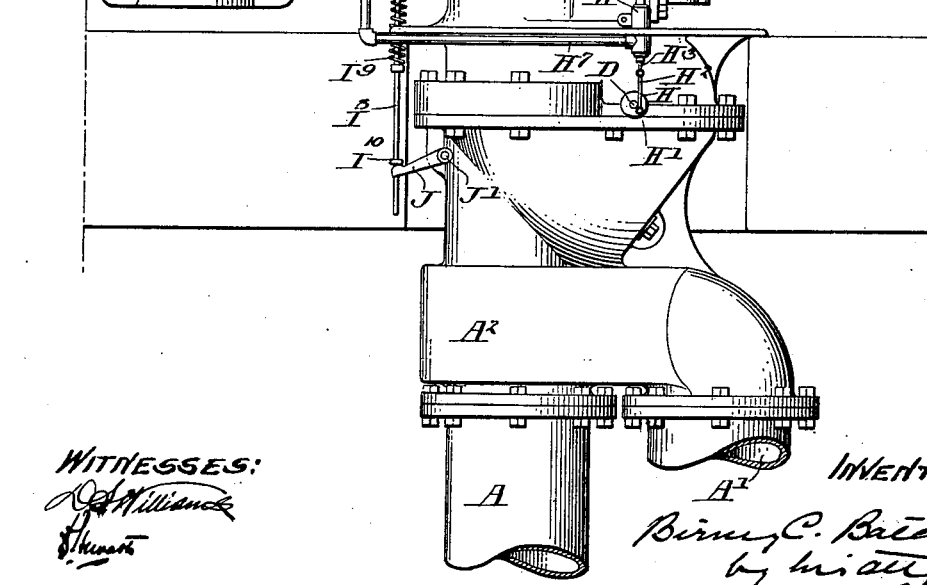

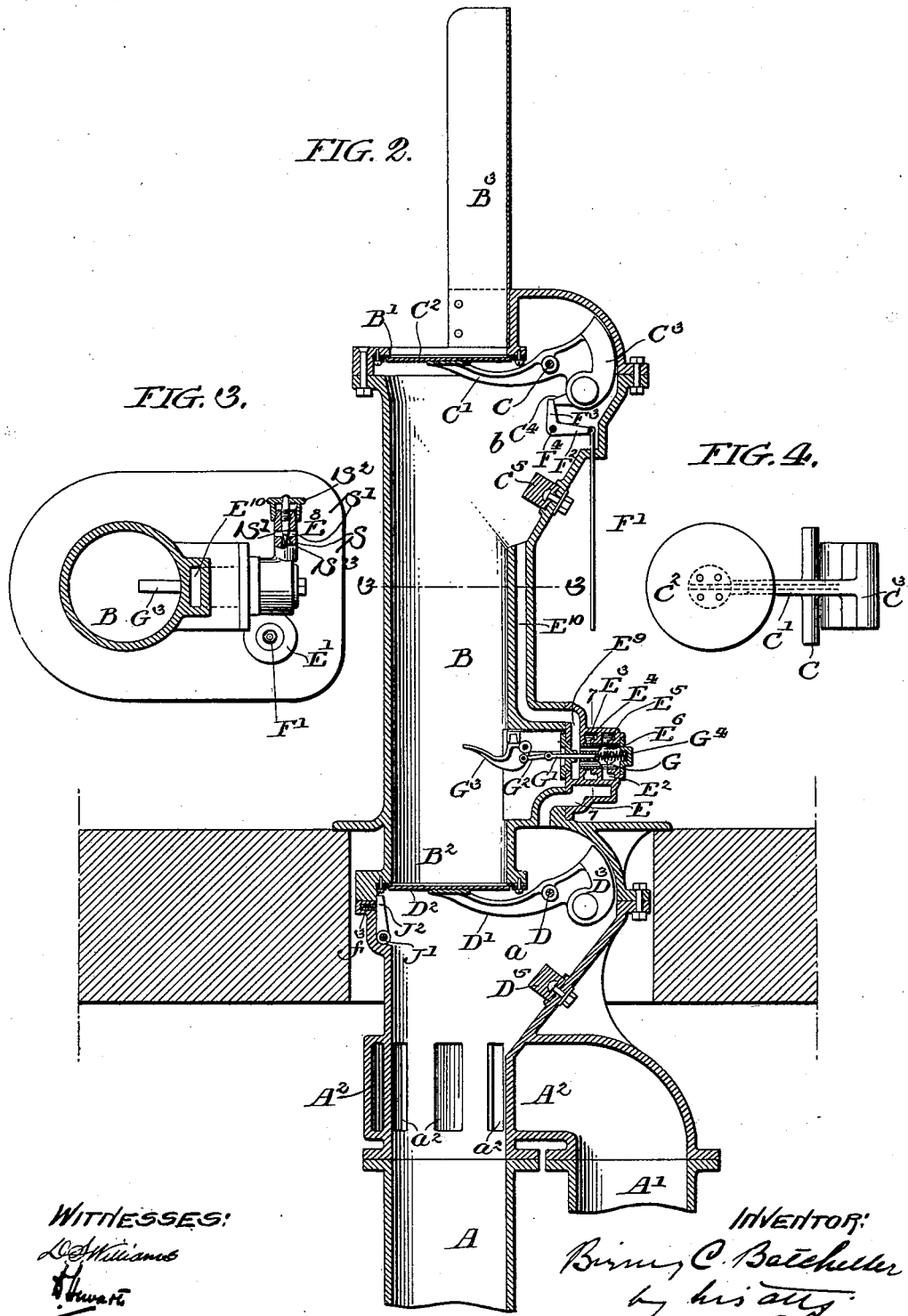

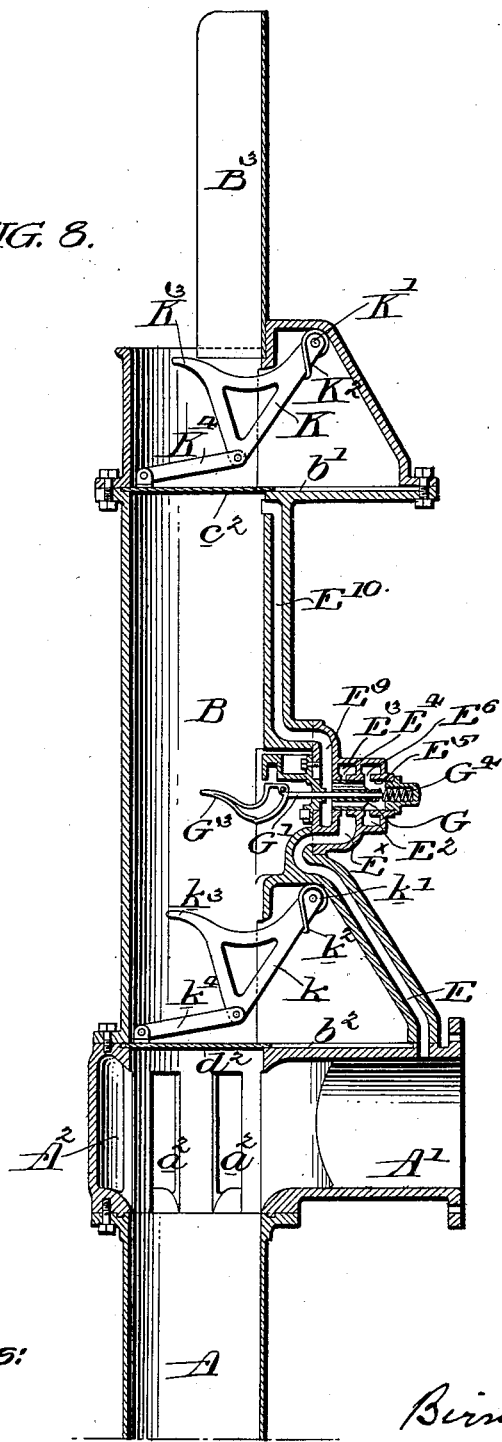

No. 700,607. Patented May 20, 1902.
B. C. BATCHELLER.
SENDING APPARATUS FOR PNEUMATIC DESPATCH SYSTEMS.
(Application filed July 31, 1901.)
(No Model.) 7 Sheets—Sheet 4.
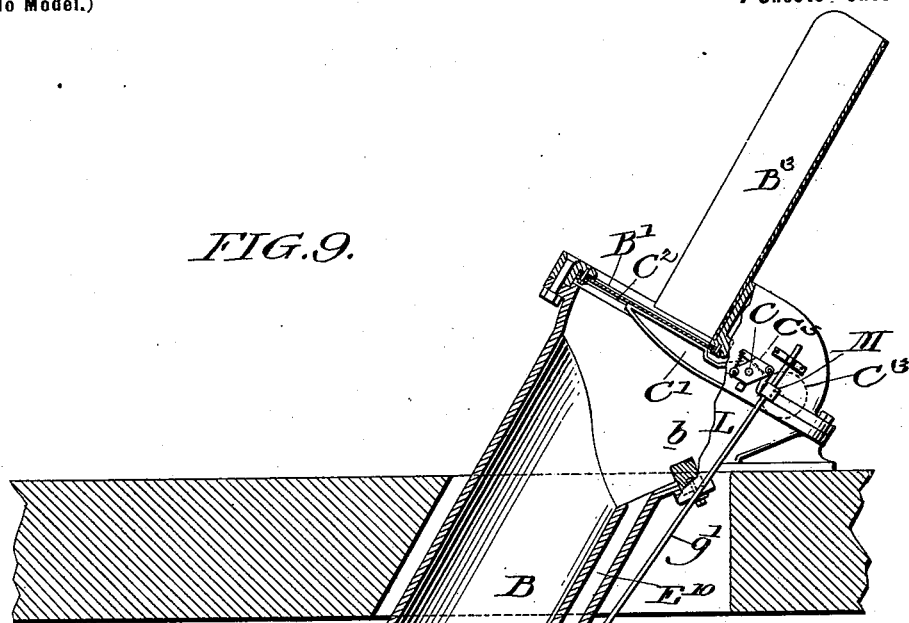
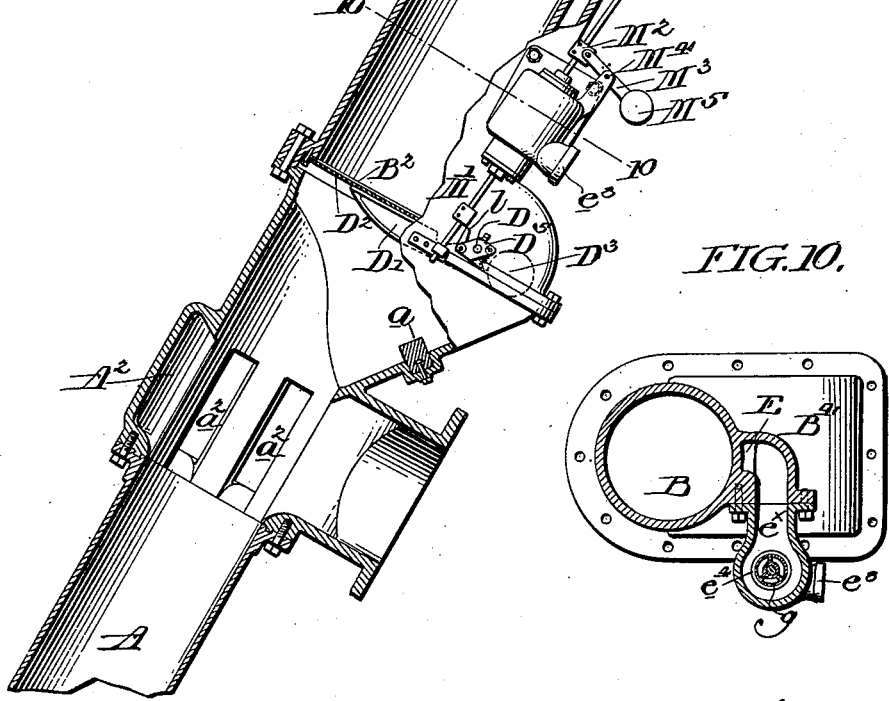
WITNESSES: INVENTOR:

No. 700,607. Patented May 20, 1902.
B. C. BATCHELLER.
SENDING APPARATUS FOR PNEUMATIC DESPATCH SYSTEMS.
(Application filed July 31, 1901.)
(No Model.) 7 Sheets—Sheet 5.
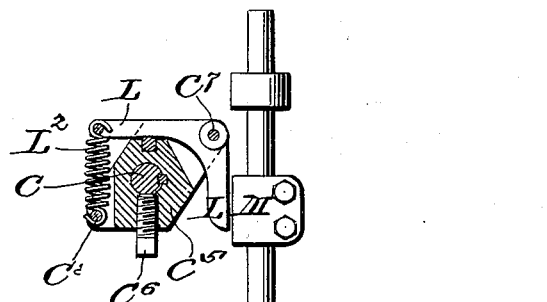
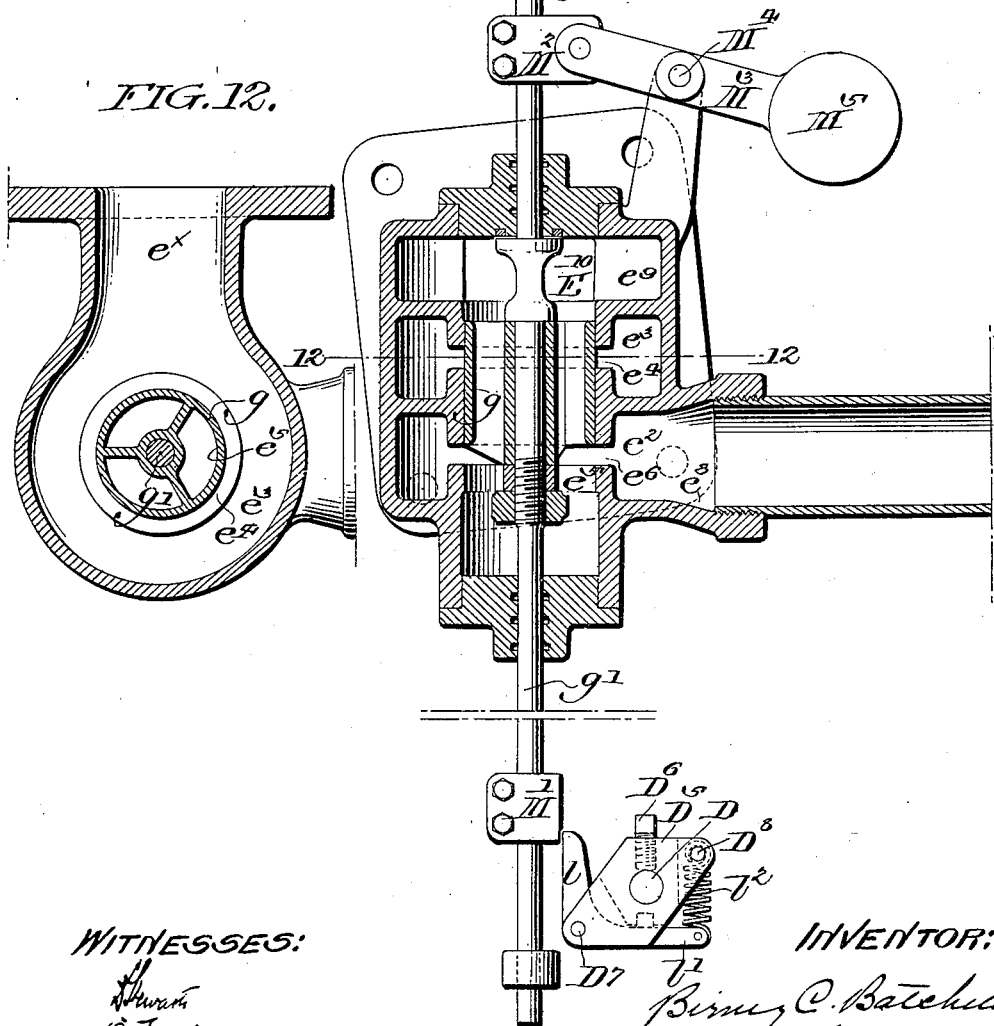
WITNESSES: INVENTOR:

No. 700,607. Patented May 20, 1902.
B. C. BATCHELLER.
SENDING APPARATUS FOR PNEUMATIC DESPATCH SYSTEMS.
(Application filed July 31, 1901.)
(No Model.) 7 Sheets—Sheet 6.
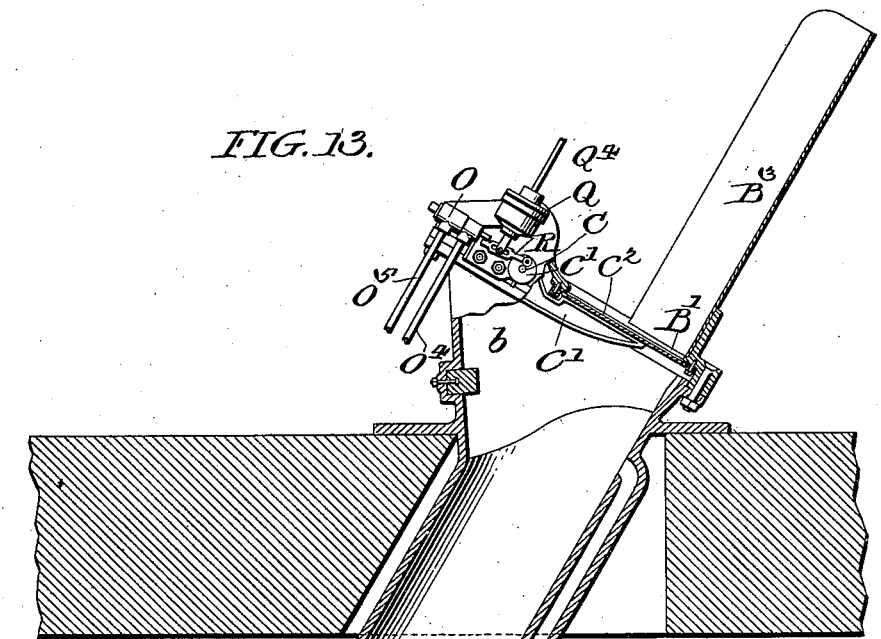
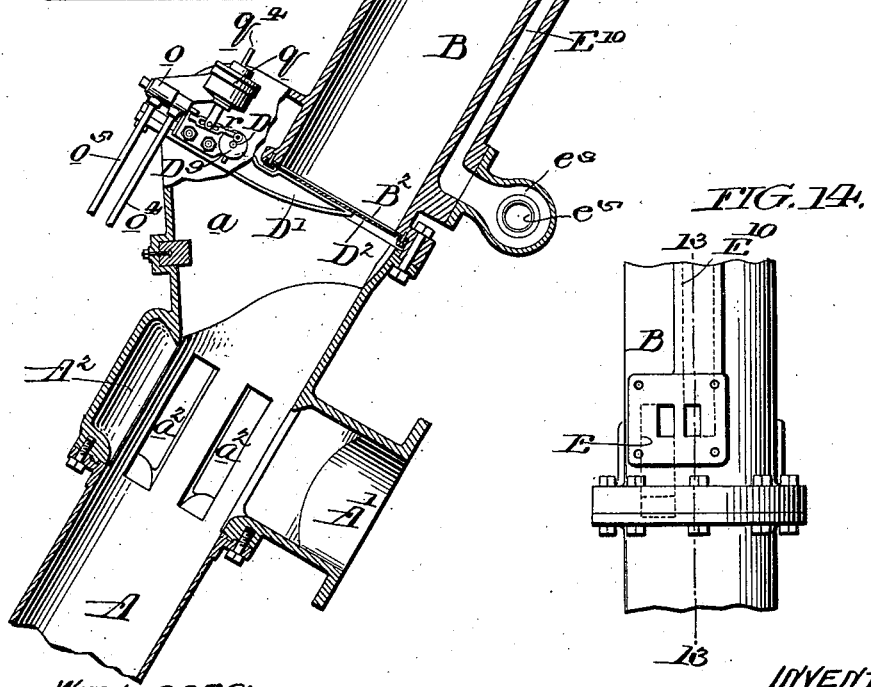

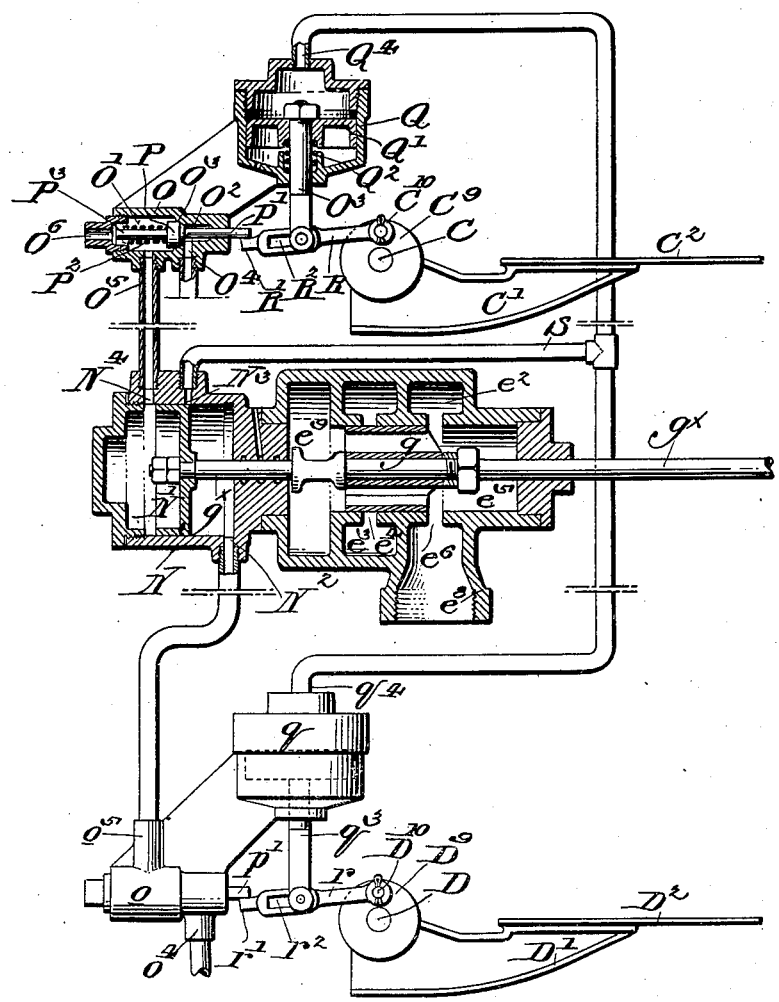

UNITED STATES PATENT OFFICE.

BIRNEY C. BATCHELLER, OF PHILADELPHIA, PENNSYLVANIA.

SENDING APPARATUS FOR PNEUMATIC-DESPATCH SYSTEMS.

SPECIFICATION forming part of Letters Patent No. 700,607, dated May 20, 1902.

Application filed July 31, 1901. Serial No. 70,328. (No model.)

*To all whom it may concern:*

Be it known that I, BIRNEY C. BATCHELLER, a citizen of the United States of America, residing in the city and county of Philadelphia, in the State of Pennsylvania, have invented certain new and useful Improvements in Sending Apparatus for Pneumatic-Despatch Systems, of which the following is a true and exact description, reference being had to the accompanying drawings, which form a part thereof.

My invention relates to pneumatic-despatch systems, and especially to the sending mechanism through which carriers are inserted into the transmission-tubes.

The object of my invention is to provide a sender of great simplicity of construction and of effective action; and, broadly speaking, my invention consists in connecting with the transmission-tube a sender-chamber having inner and outer gates and provided with means whereby the insertion of a carrier sets in operation mechanism which admits to the sender the pressure of the transmission-tube, so as to equalize the pressure on the inner gate and permit it to open for the entrance of the carrier into the transmission-tube. By preference my sender is also provided with mechanism whereby the exit of the carrier sets in operation means for admitting atmospheric pressure to the sender, so as to relieve the outer gate of pressure.

My invention is capable of application in various forms and modifications, some of which I have illustrated in the drawings, in which—

Figure 1 is a side elevation of a sender embodying my invention. Fig. 2 is also a side elevation of the same apparatus, showing it in longitudinal section. Fig. 3 is a cross-section on the line 3 3 of Fig. 2. Fig. 4 is a plan view of one of the gates; Fig. 5, a sectional elevation of a time-lock escapement for holding the inner gate closed; Fig. 6, a sectional elevation of a valve used in connection with the time-lock, and Fig. 7 a cross-sectional view on the line 7 7 of Fig. 2. Fig. 8 is a longitudinal sectional elevation of a sender embodying my invention, but employing sliding instead of swinging gates, as shown in the construction of the earlier figures. Fig. 9 is a sectional elevation of still another modification of my sending apparatus, Fig. 10 being a cross-sectional view on the line 10 10 of Fig. 9; Fig. 11, a central longitudinal section through the valve-casing employed in the modification of Fig. 9, showing connected parts on a larger scale; and Fig. 12 is a cross-section on the line 12 12 of Fig. 11. Fig. 13 is a sectional elevation of still another modification of my improved sending device, Fig. 14 being a face view of the portion of the sender-casting to which the valve is attached, and Fig. 15 in part a sectional elevation through the valves, showing in connection therewith connected parts all on a larger scale.

A indicates the transmission-tube, to the end of which, as shown, is attached the sender-chamber, the upper end of the transmission-tube being enlarged, as indicated at $a$ in all of the modifications except that of Fig. 8, to give room for the movement of the swinging gate.

A' indicates the connecting-pipe, through which air is supplied to the transmission-tube, this pipe connecting with an annular chamber $A^2$, which in turn communicates with the transmission-tube through slots $a^2$.

B indicates the sender-chamber, preferably made in the form of a tube and where swinging gates are employed having an enlargement $b$ at the top to permit the proper movement of the upper gate.

B' and $B^2$ indicate the seats upon which the upper and lower gates rest when closed, these seats being in the case of the modification of Fig. 8 replaced by guideways $b'$ and $b^2$.

$B^3$ indicates a chute at the top of the sender, upon which the carrier is rested, with its lower end resting upon the upper gate.

C is the pivot-shaft to which is attached the arm C', supporting the upper gate, (indicated at $C^2$,) $C^3$ indicating a counterweight by means of which the gate is normally closed. The construction of the lower gate is similar, D indicating the pivot-shaft to which the arm D' is attached, said arm supporting the gate, $D^2$ and $D^3$ indicating the counterweight for holding the gate closed. These features are practically the same in all the modifications illustrated except that of Fig. 8, which will be referred to later on.

In the construction shown in Fig. 2 the counterweight projection $C^3$ has attached to it a finger (indicated at $C^4$) which operates a valve-actuating lever to be hereinafter described.

In all the modifications shown there is illustrated or indicated a conduit E, which leads to a chamber or receptacle containing air under substantially the same pressure as that in the transmission-tube and preferably, as shown, to the transmission-tube or a part immediately connected therewith. This conduit connects through a valve-casing with a conduit $E^{10}$, which leads into the sender-chamber, and the valve-chamber has also a connection (indicated at $E^8$ or $e^8$) leading to the outer air. The valve moving in the valve-chamber is normally in the position connecting the conduit $E^{10}$ with the atmospheric connection and closing the connection with the conduit E and is actuated by mechanism in turn controlled by the entrance and exit of the carrier from the sender and whereby the introduction of the carrier shifts the valve to cut off the atmospheric connection and connect the conduits E and $E^{10}$ and whereby also the passage of the carrier from the sender restores the normal position of the valve, as above described.

In the modification illustrated in Figs. 2, 3, and 7 the conduit E (see Fig. 7) connects with a cylindrical chamber $E'$, through which an annular port leads to an annular chamber $e^3$, connecting at one portion with a chamber $E^3$, surrounding the cylindrical valve-chamber $E^5$, and communicating with the interior of said chamber through a port $E^4$. Also surrounding the chamber $E^5$ is the chamber $E^2$, communicating with it through a port $E^6$ and connecting also with the atmospheric connection, (indicated at $E^8$.) $E^9$ indicates a chamber connecting with the sender end of the valve-chamber $E^5$ and with the conduit $E^{10}$. G is a cylindrical valve moving in the chamber $E^5$ and having transverse passages formed through it, the movement of the valve being such as to alternately close the ports $E^6$ and $E^4$. This valve is actuated by a valve-stem $G'$, which, through a connecting-rod $G^2$, is secured to a pivoted finger $G^3$, projecting into the sender-tube, a spring $G^4$ holding the parts normally in the position shown in Fig. 2.

Returning now to the mechanism shown in Fig. 7, F is a valve having transverse passages formed in it, said valve moving in the cylindrical chamber $E'$ and being actuated by a rod $F'$, which (see Fig. 2) is connected at top with a bell-crank lever $F^2$ $F^3$, pivoted at $F^4$ and actuated in one direction by the weight of the valve aided, if necessary, by a spring $F^5$ (shown in Fig. 1) and in the other direction by the heel $C^4$, connected with the upper gate.

The operation of the described mechanism is as follows: The opening of the gate $C^2$ by the insertion of a carrier retracts the finger $C^4$, permitting the valve F to move down to the position indicated in Fig. 7, closing the connection between the conduit E and the valve-chamber $E^3$, and the closing of the gate $C^2$ after the insertion of the carrier by means of the counterweight $C^3$ raises valve F, so as to connect the specified parts. The carrier entering the sender comes in contact with the finger $G^3$, depressing it and shifting the valve G to the position in which it closes the port $E^6$ and opens the port $E^4$, so that as soon as the gate $C^2$ has closed and the valve F been thereby raised the pressure of the air in the transmission-tube is communicated through the conduit $E^{10}$ to the interior of the sender, thus equalizing the pressure on each side of the gate $B^2$, so that the weight of the carrier resting on said gate is sufficient to open it and permit the carrier to fall into the transmission-tube, the gate D closing at once after the passage of the carrier. The exit of the carrier from the sender also permits the spring $G^4$ to restore the valve G to the position shown in Fig. 2, closing the port $E^4$ and opening the port $E^6$, whereby the conduit $E^{10}$ is placed in communication with the exhaust $E^8$ and the pressure in the sender restored to atmospheric pressure, thus equalizing the pressure on both sides of the upper gate and bringing the apparatus to condition for the insertion of a new carrier.

While referring to the construction shown in Figs. 1 to 7, I will state that it is advisable to provide against the insertion of carriers into the transmission-tube too close together, and for this purpose I have shown in this modification of my invention a locking-bar $J^2$, Fig. 2, which is normally in the position shown in Fig. 2 and out of the path of the lower gate. This locking-bar is attached to the rock-shaft $J'$, which in turn has attached to it the lever J, (see Fig. 1,) which is held in normal position by the weight of the rod $I^8$ and connected parts which rest upon it through the collar $I^{10}$, this weight being sufficient to compress the spring $f^3$, (shown in Fig. 2,) which spring when not opposed by a superior force presses the locking-bar $J^2$ out, so that it comes beneath the gate $B^2$ and prevents its being opened. In addition to the weight of the rod $I^8$ and its connections it is preferably pressed downward by a spring $I^9$, (shown in Figs. 1 and 5,) and the upper end of the rod is connected through a plate $I^7$ with a diaphragm $I^6$ situated in the diaphragm-chamber I, said chamber having an exhaust-passage $I^2$ at its top, closed by a ball-valve $I^3$, and an entrance-passage $I^4$, regulated in area by a needle-valve $I^5$. $I'$ indicates an opening leading into the bottom of the diaphragm-chamber, with which it is connected, a conduit $H^7$ leading into the lower part of a valve-casing $H^5$, (shown in section in Fig. 6,) this casing having an exhaust-passage $H^8$ near its top and a port $H^4$, which connects by a conduit in any convenient way with the transmission-tube or a connected port. $H^6$ indicates the valve moving in the chamber $H^5$ and having transverse apertures through it, said valve being actuated by a rod H³, connected by a connecting-bar H² with a crank-pin H' on a plate H, secured to the pivot-shaft D of the lower gate.

The operation of the locking device is as follows: The normal position of the valve H⁶ is as shown in Fig. 6, the normal position of the diaphragm and rod I⁸ as shown in Figs. 1 and 5, and the normal position of the locking-bar J² as shown in Fig. 2, the conduit H⁷, leading to the bottom of the diaphragm-chamber, communicating freely through the casing H⁵ and hollow valve H⁶ with the exhaust-port H⁸. When the inner gate B² opens, the turning of the shaft D, to which it is attached, forces the crank-pin H' upward, pushing the valve H⁶ upward in the casing, so that it closes the port H⁸ and opens the port H⁴, the air under pressure passing then through the casing and conduit H⁷ into the bottom of the diaphragm-chamber, forcing the diaphragm up to the top of the chamber and lifting the rod H⁸, the air in the diaphragm-chamber escaping through the passage I². The closing of the gate B² restores the valve to the position shown in Fig. 6 and connects the bottom of the diaphragm-chamber with the exhaust. The spring I⁹ then draws the diaphragm downward, but only with such rapidity as is permitted by the adjustment of the valve I⁵, which regulates the admission of air to the top of the diaphragm-chamber. In the meanwhile the locking-bar J² projects out under the bottom of the gate B², preventing it from opening until the diaphragm has passed to the bottom of the chamber and the collar I¹⁰, by pressing on the lever-arm J, has restored the locking-bar to the position shown in Fig. 2. In this way a definite interval must necessarily pass between the introduction of consecutive carriers into the transmission-tube.

By preference I also provide a time-escapement for preventing the introduction of carriers to the sender with too great rapidity, and this I accomplish by the simple expedient of restricting the exhaust-passage, by which the sender-chamber B is placed in communication with the atmosphere. Thus, as shown in Fig. 3, the exhaust-passage E⁸ may be provided with a regulating-valve of any kind. As shown, the exhaust-passage is formed with lateral passages S' S', connecting with its central perforation S, and a cap S² has connected with it a needle-valve S³, the cap screwing on the end of the exhaust-passage and the needle-valve being adjustable in this passage as indicated. The operation of this restricted orifice however constructed is as follows: It has already been explained how the introduction of the carrier into the sender is made the point of communication by which the pressure of the transmission-tube is communicated to the sender-chamber and how the passage of the carrier out of the sender-chamber is made to restore communication between said chamber and the atmosphere, this communication being effected through the escape-passage of exhaust E⁸. Obviously if this passage be restricted the air under pressure in the chamber will only escape gradually, and then the gate C² will be held closed for a definite period after the carrier has escaped from the sender.

Referring next to the modification of my invention illustrated in Fig. 8, the mechanism illustrated is substantially the same as in the previously-described construction, except that in place of the swinging gates the sender is provided with sliding gates (indicated at $c^2$ and $d^2$) moving in guideways, (indicated at $b'$ and $b^2$.) These sliding gates are connected by links K⁴ and $k^4$ with the levers K $k$, pivoted at K' $k'$, and provided with projecting fingers K³ $k^3$, which extend out into the path of the carrier, passing to and through the sender-chamber. The levers and gates are held in the position indicated in Fig. 8 by springs, (indicated at K² and $k^2$,) which of course are the full equivalents for the counterweights shown in connection with the swinging gates. It will be obvious that a carrier introduced into the chute B³ will by pressing on the finger K³ cause the gate $c^2$ to open, said gate closing immediately after the entrance of the carrier by the action of a spring K². The carrier then acts on the valve-actuating finger G³, as in the former construction, and coming in contact with the finger $k^3$ opens the gate $d^2$, said gate closing in its passage under the action of the spring $k^2$ and the operation of the valve being precisely the same as in the previously-described construction.

I will state here that while my invention is especially intended for use in pneumatic-despatch systems working with air under pressure it is perfectly well adapted for use with vacuum systems, this being clearly evident by a consideration of the construction shown in Fig. 8, which will work just as well whether the air-current passing through the transmission-tube A is above or below atmospheric pressure, the only difference being that the connection of the transmission-tube with the sender-chamber reduces the pressure in that chamber and the connection of the sender-chamber with the exhaust or atmospheric connection E⁸ will in the case of the vacuum system serve to admit atmospheric air to the chamber instead of permitting the high pressure in said chamber to fall to atmospheric pressure, as previously described.

Referring next to the modification illustrated in Figs. 9 to 12, inclusive, I would state in the first place that this construction is designed to illustrate the feasibility of dispensing with the valve-actuating finger G³ and of regulating the admission and exhaust of air to the sender-chamber by the movement of the gates. The pivoted shaft C of the gate C² has attached to one of its ends a block (indicated at C⁵, best shown in Fig. 11) held in place on the shaft by a set-screw C⁶ and supporting a pivot-pin C⁷ and another pin C⁸.

Pivoted on the pin $C^7$ is the bell-crank lever (indicated at L L') normally in the position indicated by a spring $L^2$, fastened to the end of the arm L' and to the pin $C^8$. The shaft D of the lower gate has a similar attachment to its corresponding end, the block being indicated at $D^5$, the set-screw at $D^6$, the fixed pins at $D^7$ and $D^8$, the bell-crank lever at $l$ $l'$, and the spring at $l^2$. The sender-chamber is provided, as in the former constructions, with air-ports E and $E^{10}$, connecting through a valve-casing, which is substantially like the one previously described and those illustrated in Figs. 10, 11, and 12, the intermediate chamber (indicated at $e^3$) communicating through a lateral outlet $e^\times$ with the conduit E, as best shown in Fig. 10, while the upper chamber (indicated at $E^9$) communicates with the conduit $E^{10}$, and the lower chamber $e^2$ communicates with the exhaust connection $e^8$. $e^5$ indicates the cylindrical valve-chamber, communicating at one end with the chamber $e^9$ and through the ports $e^4$ and $e^6$ with the chambers $e^3$ and $e^2$. $g$ indicates the hollow piston-valve working in the chamber $e^5$ and actuated by a valve-rod $g'$, properly guided, so as to come close to the blocks $C^5$ and $D^5$, and having attached to it blocks M and M', which are acted upon by the lever-arms L and $l$, as will be described. The rod $g$ has also attached to it a block $M^2$, to which is pivotally attached one arm of the lever $M^3$, pivoted on a standard at $M^4$ and having attached to its free end a counterweight $M^5$, the function of which is to balance the weight of the valve and valve-rod. In operation the opening of the gate $C^2$, turning the pivoted shaft C, causes the block $C^5$ to rotate toward the left and raises the point of the lever-arm L above the block M, the spring $L^2$ yielding to permit the lifting of the lever-arm L, and as soon as it passes the block M forcing the point of this lever-arm out over the top of the block. The closing of the gate $C^2$, rotating the block $C^5$ in the opposite direction, causes the lever-arm L to press down upon the block M, moving it, the valve-rod $g'$, and the valve $g$ down, so as to close the port $e^6$ and open the port $e^4$, thus connecting the conduits E and $E^{10}$ and permitting the air under pressure in the transmission-tube to fill the sender-chamber. The opening of the gate $B^2$ causes the arm $l$ to act in a precisely similar manner upon the block L', the closing of the gate lifting the block, valve-rod, and valve to the position shown in Fig. 11, cutting off the admission of high-pressure air from the conduit E, and placing the sender-chamber, through the conduit $E^{10}$, the hollow valve G, the port $e^6$, chamber $e^2$, and passage $e^8$, in communication with the atmosphere.

Referring next to the modification illustrated in Figs. 13 to 15, inclusive, I would state in the first place that this modification is simply an illustration of the feasibility of applying compressed air to shift the valve regulating the admission and exhaust of air from the sender-chamber. The valve and valve-casing illustrated in section in Fig. 15 are substantially the same as those illustrated in Fig. 11, except that the valve-rod (here indicated by the symbol $g^\times$) has attached to one end the piston N', moving in a cylinder-chamber N, having leading into it the ports $N^2$, $N^3$, and $N^4$, the ports $N^2$ and $N^4$ communicating with valve-casings, (indicated at $o$ and O,) the latter being indicated in section and containing the two chambers O' and $O^2$, connecting through a valve-seat $o^3$, the chamber O' connecting through a conduit $O^5$ with the the port $N^4$, which, as does the similar chamber in the casing $o$, connects through the pipe $o^5$ with the port $N^2$. The chamber $O^2$ connects through a port $O^4$ with some chamber containing air under pressure. The intermediate port (indicated at $N^3$) connects through a branch pipe (indicated at S) with the ports $Q^4$ $q^4$ of the two cylinder-chambers Q $q$, the upper one being shown in section, illustrating how each chamber is provided with a piston Q', which is held up normally by a spring $Q^2$ and is provided with a rod $Q^3$, connecting through a pin with a slot $R^2$ under the rod R, pivotally connected to a crank-pin $C^{10}$, secured in a disk $C^9$, fastened to the pivot-shaft C of the upper gate, the similar construction connected with the lower cylinder $q$ being similarly attached to the pivoted shaft of the lower gate. P indicates a valve normally held to the seat $O^3$ by a spring $P^2$ and having attached to it a spindle P', which projects through the casing and is adapted to be knocked by the end R' of the rod R, as will be hereinafter described. A rearward prolongation of the valve-spindle (indicated at $P^3$) extends into and closes when the valve is lifted from its seat, the rear opening indicated at $O^6$ in the valve-casing.

Passing now to the operation of the device illustrated, the normal position of the parts is as shown in Fig. 15. The opening of the gate $C^2$ draws the rod R toward the right until its end R' clears the end of the valve-spindle P', whereupon it is lifted to a position in which it comes directly opposite to the end of the valve-spindle by the action of the spring $Q^2$. The closing of the gate $C^2$ forces the rod R backward, and as its end abuts against the valve-spindle the spindle and valve are also forced backward, opening the port $O^3$ and closing the port $O^6$ by the entrance of the spindle extension $P^3$. The air under pressure then passes from the chamber $O^2$ to the chamber O' and through the pipe $O^5$ and port $N^4$ into the left-hand end of the cylinder N, forcing the piston N' toward the right and shifting the valve $g$ to the position in which it closes the port $e^6$ and opens the port $e^4$. This places the conduit E in communication with the conduit $E^{10}$ through the valve-casing, permitting the high-pressure air to enter and fill the sender-chamber, so as to balance the pressure on the lower gate B². As soon as the piston N' has moved the required distance its rear end uncovers the port N³, so that the high-pressure air in the cylinder N will pass through the pipe S and its upper branch into the top of the cylinder Q, where, acting upon the piston Q', it depresses this piston to the position shown in Fig. 15, forcing the rod R downward until it clears the end of the valve-spindle P', whereupon the valve P is forced to its seat, closing the connection between the chambers O² and O⁸ and permitting the high-pressure air in the cylinder N and its connections to exhaust through the port O⁶, which is left open by the movement of the spindle P³. The opening of the gate D² through a precisely similar system of mechanism admits high-pressure air to the right-hand end of the cylinder N, forcing the piston N' toward the left and shifting the position of the valve $g$ to the point illustrated in Fig. 15, which results in placing the interior of the sender-chamber, through the conduit E¹⁰ and the valve-casing, in communication with the exhaust $e^8$. The shifting of the piston N' toward the left places the port N³ in communication with the right-hand end of the cylinder N, permitting the high-pressure air to pass through the pipe S and its lower branch into the cylinder $q$, where it acts precisely as in the cylinder Q to cut off the supply of high-pressure air to the cylinder N and to place said cylinder in communication with the exhaust.

Having now described my invention, what I claim as new, and desire to secure by Letters Patent, is—

1. In a pneumatic-despatch system, a sender connected to a transmission-tube in combination with outer and inner gates adapted to open under the pressure of an inserted carrier, means for closing said gates when the carrier has passed them and means actuated by the insertion of a carrier into the sender for connecting the sender with an air-receptacle having substantially the pressure of the transmission-tube for the purpose of equalziing pressure on the inner gate.

2. In a pneumatic-despatch system, a sender connected to a transmission-tube in combination with outer and inner gates adapted to open under the pressure of an inserted carrier, means for closing said gates when the carrier has passed them, means actuated by the insertion of a carrier into the sender for connecting the sender with an air-receptacle having substantially the pressure of the transmission-tube for the purpose of equalizing pressure on the inner gate and means for admitting atmospheric pressure to the sender actuated by the passage of the carrier from the sender.

3. In a pneumatic-despatch system, a sender connected to a transmission-tube in combination with outer and inner gates adapted to open under the pressure of an inserted carrier, means for closing said gates when the carrier has passed them and means actuated by the insertion of a carrier into the sender for connecting the sender with the transmission-tube for the purpose of equalizing pressure on the inner gate.

4. In a pneumatic-despatch system, a sender connected to a transmission-tube in combination with outer and inner gates adapted to open under the pressure of an inserted carrier, means for closing said gates when the carrier has passed them, means actuated by the insertion of a carrier into the sender for connecting the sender with the transmission-tube for the purpose of equalizing pressure on the inner gate and means for admitting atmospheric pressure to the sender actuated by the passage of the carrier from the sender.

5. In a pneumatic-despatch system, a sender connected to a transmission-tube in combination with outer and inner gates adapted to open under the pressure of an inserted carrier, a valve mechanism arranged in one position to connect the sender with an air-receptacle having substantially the pressure of the transmission-tube and in another position to connect the sender with atmospheric pressure, means actuated by the insertion of a carrier into the sender to shift said valve to the first position and means actuated by the passage of the carrier from the sender to shift said valve to the second position.

6. In a pneumatic-despatch system, a sender connected to a transmission-tube in combination with outer and inner gates adapted to open under the pressure of an inserted carrier, a valve mechanism arranged in one position to connect the sender with an air-receptacle having substantially the pressure of the transmission-tube and in another position to connect the sender with atmospheric pressure, means actuated by the opening and closing of the outer gate to shift said valve to the first position and means actuated by the opening and closing of the inner gate to shift said valve to the second position.

7. In a pneumatic-despatch system, a sender connected to a transmission-tube in combination with outer and inner gates adapted to open under the pressure of an inserted carrier, means for closing said gates when the carrier has passed them, means actuated by the insertion of a carrier into the sender for connecting the sender with an air-receptacle having substantially the pressure of the transmission-tube for the purpose of equalizing pressure on the inner gate, means for admitting atmospheric pressure to the sender actuated by the passage of the carrier from the sender, and a restricted orifice in the atmospheric connection whereby the restoration of atmospheric pressure in the sender is made gradual.

8. In a pneumatic-despatch system, a sender connected to a transmission-tube in combination with outer and inner gates adapted to open under the pressure of an inserted carrier, means for closing said gates when the carrier has passed them means actuated by the insertion of a carrier into the sender for connecting the sender with an air-receptacle having substantially the pressure of the transmission-tube for the purpose of equalizing pressure on the inner gate, a lock for holding a gate closed set in operation by the passage of the carrier from the sender and a time escapement for withdrawing said lock.

BIRNEY C. BATCHELLER.

Witnesses:
  CHAS. A. MYERS,
  D. STEWART.